US012191511B2

(12) United States Patent
Tse et al.

(10) Patent No.: US 12,191,511 B2
(45) Date of Patent: Jan. 7, 2025

(54) BATTERY CELL WITH SERPENTINE TAB

(71) Applicant: Apple Inc., Cupertino, CA (US)

(72) Inventors: Kyle Tse, Fremont, CA (US); Abhishek P. Shiwalkar, Sunnyvale, CA (US); Shawn G. Fink, Sunnyvale, CA (US); Christopher R. Pasma, Redwood City, CA (US); Hirotsugu Oba, Sunnyvale, CA (US); Brian K. Shiu, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 859 days.

(21) Appl. No.: 16/874,355

(22) Filed: May 14, 2020

(65) Prior Publication Data

US 2020/0403210 A1 Dec. 24, 2020

Related U.S. Application Data

(60) Provisional application No. 62/864,071, filed on Jun. 20, 2019.

(51) Int. Cl.
*H01M 50/531* (2021.01)
*H01M 50/186* (2021.01)
*H01M 50/191* (2021.01)
*H01M 50/533* (2021.01)

(52) U.S. Cl.
CPC ....... *H01M 50/186* (2021.01); *H01M 50/191* (2021.01); *H01M 50/531* (2021.01); *H01M 50/533* (2021.01)

(58) Field of Classification Search
CPC ............. H01M 50/531; H01M 50/186; H01M 50/191; H01M 50/107; H01M 50/567; H01M 50/599; H01M 10/0431
See application file for complete search history.

(56) References Cited

U.S. PATENT DOCUMENTS

| 261,677 | A | * | 7/1882 | Clarke et al. | ........ A61B 5/0091 |
| | | | | | 315/33 |
| 4,350,747 | A | | 9/1982 | Alberto | |
| 4,358,514 | A | | 11/1982 | Garoutte et al. | |

(Continued)

FOREIGN PATENT DOCUMENTS

| CA | 2755597 | 1/2015 |
| CN | 101533899 A | 9/2009 |

(Continued)

OTHER PUBLICATIONS

Machine translation in English of JP2017147069 (Year: 2022).*
Machine Translation in English of JP2009295565 (Year: 2022).*

*Primary Examiner* — Brian R Ohara
*Assistant Examiner* — Emily Elizabeth Freeman
(74) *Attorney, Agent, or Firm* — BakerHostetler

(57) ABSTRACT

The disclosed technology relates to an electrical feedthrough for a battery cell. The electrical feedthrough may include a pin configured to form an external battery terminal, an insulator surrounding the pin and configured to electrically isolate the pin, a channel, and a serpentine tab electrically coupled to the pin at a first end. The serpentine tab is nested within the channel to minimize use of space within an enclosure of the battery cell thereby increasing energy capacity of the battery cell by eliminating the need to allot space within the enclosure to accommodate the tab.

11 Claims, 5 Drawing Sheets

(56) References Cited

U.S. PATENT DOCUMENTS

| | | |
|---|---|---|
| 4,559,283 A | 12/1985 | Kruger et al. |
| 4,572,877 A | 2/1986 | Botos |
| 5,004,656 A | 4/1991 | Sato et al. |
| 6,426,163 B1 | 7/2002 | Pasquier et al. |
| 8,043,738 B2 | 10/2011 | Suzuki et al. |
| 8,053,106 B1 * | 11/2011 | Pal .................... H01M 50/147 |
| | | 429/175 |
| 9,118,087 B2 | 8/2015 | Abe et al. |
| 9,616,518 B2 | 4/2017 | Kroll et al. |
| 2003/0017390 A1 | 1/2003 | Probst et al. |
| 2003/0096162 A1 | 5/2003 | Lasater et al. |
| 2003/0124420 A1 | 7/2003 | Fong et al. |
| 2004/0191621 A1 | 9/2004 | Heller |
| 2004/0214079 A1 | 10/2004 | Simburger et al. |
| 2005/0266279 A1 * | 12/2005 | Kim .................... H01M 50/559 |
| | | 429/57 |
| 2007/0090788 A1 | 4/2007 | Hansford et al. |
| 2007/0122697 A1 | 5/2007 | Wutz et al. |
| 2011/0189535 A1 | 8/2011 | Kim et al. |
| 2012/0160558 A1 | 6/2012 | Okamoto et al. |
| 2012/0202107 A1 | 8/2012 | Ito |
| 2012/0237817 A1 | 9/2012 | Kim et al. |
| 2015/0072201 A1 * | 3/2015 | Kubota .............. H01M 50/107 |
| | | 429/94 |
| 2015/0140417 A1 | 5/2015 | Matsumoto et al. |
| 2016/0268582 A1 | 9/2016 | Lee et al. |
| 2016/0315306 A1 | 10/2016 | Jang et al. |
| 2017/0092907 A1 | 3/2017 | Hyung et al. |
| 2017/0162838 A1 | 6/2017 | Revirand et al. |
| 2018/0026256 A1 | 1/2018 | Inoue et al. |
| 2018/0083256 A1 | 3/2018 | Marasco et al. |
| 2018/0083312 A1 | 3/2018 | Shiu et al. |
| 2018/0130994 A1 * | 5/2018 | Yamaguchi ............. H01M 4/80 |
| 2019/0341587 A1 | 11/2019 | Pasma et al. |
| 2020/0083498 A1 | 3/2020 | Shiu et al. |
| 2020/0176728 A1 | 6/2020 | Shiu et al. |
| 2020/0280027 A1 * | 9/2020 | Yamagami .......... H01M 50/533 |
| 2020/0373548 A1 | 11/2020 | Kozuki |
| 2021/0066742 A1 * | 3/2021 | Im .......................... C09J 163/00 |

FOREIGN PATENT DOCUMENTS

| | | |
|---|---|---|
| CN | 102197515 A | 9/2011 |
| CN | 102629672 A | 8/2012 |
| CN | 104781946 A | 7/2015 |
| CN | 105118954 A | 12/2015 |
| CN | 106413972 A | 2/2017 |
| CN | 209947930 U | 1/2020 |
| EP | 1620907 B1 | 8/2007 |
| JP | S61-224263 | 10/1986 |
| JP | 2008-192552 A | 8/2008 |
| JP | 2009295565 A * | 12/2009 |
| JP | 2017147069 A * | 8/2017 |
| WO | WO 2004/086538 | 10/2004 |

* cited by examiner

BATTERY CELL WITH SERPENTINE TAB

PRIORITY

This application claims the benefit under 35 U.S.C. § 119(e) of U.S. Provisional Patent Application Ser. No. 62/864,071, entitled "BATTERY CELL WITH SERPENTINE TAB," filed on Jun. 20, 2019, which is incorporated herein by reference in its entirety.

TECHNICAL FIELD

The present disclosure relates generally to battery cells, and more particularly, to an electrical feedthrough with an integrally formed channel to house a serpentine tab.

BACKGROUND

Battery cells are used to provide power to a wide variety of portable electronic devices, including laptop computers, tablet computers, mobile phones, personal digital assistants (PDAs), digital music players, watches, and wearable devices. A commonly used type of battery is a lithium battery, which can include a lithium-ion or a lithium-polymer battery.

Lithium batteries often include cells that are made of alternating layers of anode and cathode electrodes, with a separator disposed there-between. The layers may be packaged in an enclosure. A first set of electrodes of the cell may be electrically coupled to a wall of the enclosure where the enclosure is itself, made of a conductive material. A second set of electrodes may utilize an electrical feedthrough to provide an electrical connection, through the enclosure, to the second set of electrodes.

Feedthroughs may utilize a tab extending from a terminal or pin to connect to electrodes enclosed within the enclosure. To enable welding of the tab to the electrodes, a working or service length of the tab is required which in turn, occupies space within the enclosure thereby reducing an amount of volume that could otherwise be occupied by the electrodes.

SUMMARY

The disclosed embodiments provide for a battery cell that utilizes a channel in a feedthrough to stow a serpentine tab that is connected to a pin of the feedthrough on one end, and a cathode layer or an anode layer on another end. The battery cell includes a set of layers that include a cathode layer, an anode layer, and a separator layer disposed between the cathode layer and the anode layer. The set of layers are enclosed within an enclosure. A feedthrough includes a pin configured to form an external battery terminal, an insulator surrounding the pin and configured to electrically isolate the pin, a channel, and a serpentine tab electrically coupled to the pin at a first end and to a tab extending from the set of layers at a second end. The serpentine tab is nested within the channel to minimize use of space within the enclosure.

In some embodiments, a battery feedthrough includes a cap, a pin disposed through an opening of the cap to form an external battery terminal, an insulator surrounding the pin and bonded to a periphery of the opening of the cap to electrically isolate the pin from the cap, a channel formed on a surface of the cap, and a serpentine tab electrically coupled to the pin at a first end. An intermediate portion of the serpentine tab and a second end of the serpentine tab are disposed entirely within the channel to minimize use of space within the cap.

In some embodiments, a method for manufacturing a battery cell is disclosed. The method includes forming a channel on a surface of a cap of a feedthrough; and insulating a pin from the cap using an insulator. The insulator is bonded to a periphery of an opening of the cap and configured to electrically insulate the pin from the cap. The method also includes welding a first end of a serpentine tab to the pin to form an external battery terminal. The method also includes inserting a set of layers within a cup of an enclosure. The set of layers include a cathode layer, an anode layer, and a separator layer disposed between the cathode layer and the anode layer. The method further includes welding a second end of the serpentine tab to a tab extending from the set of layers; and disposing the feedthrough onto the cup to enclose the set of layers. The method further includes nestling the serpentine tab within the channel of the cap to minimize use of space within the enclosure.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Rechargeable batteries for portable electronic devices often include cells that are made of alternating layers of anode and cathode electrodes, with a separator disposed there-between. The layers may be packaged in an enclosure and may utilize an electrical feedthrough to make an electrical connection to a set of electrodes enclosed within the enclosure. Feedthroughs may utilize a tab extending from a terminal or pin to connect to electrodes enclosed within the enclosure. To enable welding of the tab to the electrodes, a working or service length of the tab is required which in turn, occupies space within the enclosure thereby reducing an amount of volume that could otherwise be occupied by the electrodes, and further reducing packaging efficiency. Accordingly, there is a need for certain embodiments of a compact and robust feedthrough for use in battery cells that improves packaging efficiency and increases energy capacity of the battery cell.

The disclosed technology addresses the foregoing limitations of conventional feedthroughs for battery cells by utilizing a feedthrough having a channel formed thereon to entirely house a serpentine tab therein without utilizing additional space within the enclosure, thereby improving packaging efficiency and increasing energy capacity of the battery cell by eliminating the need to allot space within the enclosure to accommodate the tab. The serpentine tab is configured to deform and provide added length to facilitate a welding, bonding, or coupling operation to an anode layer or a cathode layer, and after welding, return to an initial shape that is entirely accommodated within the channel of the feedthrough without requiring additional space within the enclosure for storage or management of the tab.

Figure 1:
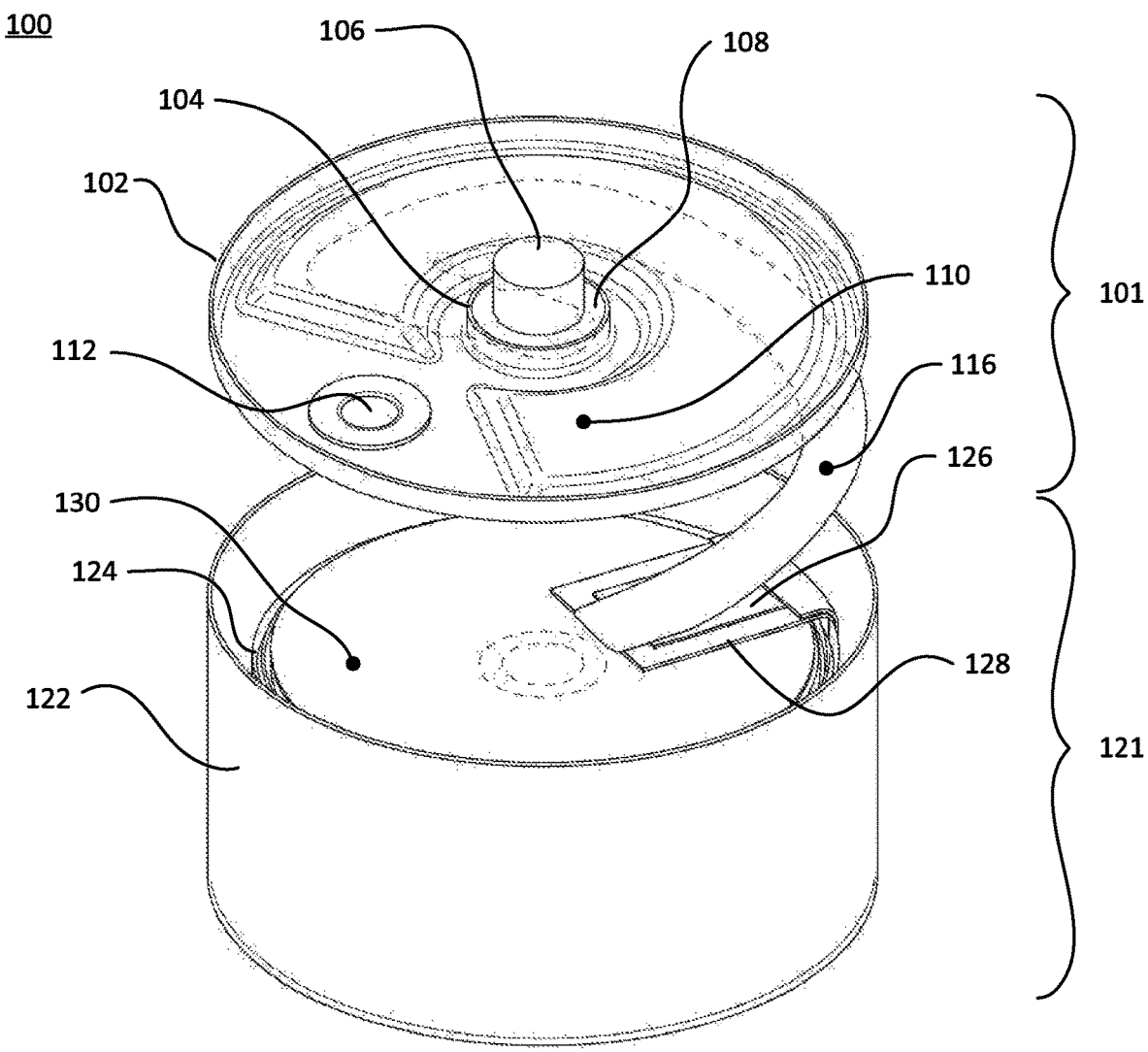
FIG. 1 illustrates a perspective view of a battery cell with a feedthrough having a channel to house a tab, in accordance with various aspects of the subject technology.

FIG. 1 illustrates a perspective view of a battery cell 100 having a feedthrough 101 with a channel 110 to house a serpentine tab 116, in accordance with various aspects of the subject technology. The battery cell 100 comprises an enclosure 121, a set of layers 124 enclosed within the enclosure 121, and a feedthrough 101. The set of layers 124 may comprise at least one cathode layer with an active coating, at least one anode layer with an active coating, and a separator disposed between the cathode layer and the anode layer. A tab 126 may extend from the cathode and/or anode layers, as discussed further below with reference to FIG. 4. In one aspect, the tab 126 extending from the set of layers 124 may comprise an exposed portion and an insulated portion 128 that is configured to insulate the tab 126. In another aspect, an insulating layer 130 may be disposed atop of the set of layers 124 to insulate the set of layers 124 from the feedthrough 101, and more particularly, to insulate the set of layers 124 from the serpentine tab 116.

The enclosure 121 may comprise a cup 122 formed of a rigid material, such as a metal alloy which may, for example, include stainless steel, aluminum, aluminum alloy, or other sufficiently rigid materials as would be known by a person of ordinary skill in the art. The enclosure 121 may have a non-corrosive coating line the interior of the enclosure 121 and is configured to enclose and protect one or more sets of electrodes or layers 124 disposed within the enclosure 121. The enclosure 121 may have a cylindrical, cuboid, prism, conical, or pyramid shape. In one aspect, the enclosure 121 may be drawn from tube stock to form a cylinder having opening on both ends. In other aspects, the enclosure 121 may have a closed end opposite an open end. The open ends may each be configured to receive the feedthrough 101.

The feedthrough 101 may comprise a cap 102, an opening 104, a terminal or pin 106, an insulator 108, a channel 110, and a serpentine tab 116. The feedthrough 101 is configured to seal the set of layers 124 within the enclosure 121 and to provide an electrical connection to the anode or cathode layer of the set of layers 124 via the serpentine tab connected to the pin 106. The feedthrough 101 may be disposed within an opening of the enclosure 121 and bonded, glued, welded, or coupled, to the enclosure 121. The feedthrough 101 may also include a plug 112 to seal a hole in the cap 102 that may be used to fill the enclosure 121 with electrolyte.

The cap 102 may be sized to cover an opening of the cup 122 and is configured to create a seal between the cup 122 and the cap 102 after a bonding, gluing, welding, or coupling operation. The opening 104 extends through the cap 102 and may comprise a lip for bonding with the insulator 108.

The pin 106 extends through the opening 104 and is insulated from the cap 102 by the insulator 108. The pin 106 is configured to form an external battery terminal for the anode or cathode layers of the set of layers 124 enclosed in the enclosure 121. The pin 106 extends through the insulator 108 and is electrically coupled to the cathode or anode of the set of layers 124 via the serpentine tab 116 to form an external battery terminal. The pin 106 may comprise a metal or alloy, or material that is capable of conducting electricity, such as molybdenum. In one aspect, the pin 106 may be spot welded, ultra-sonically welded, percussion welded, or resistance welded to the serpentine tab 116 at a first end of the serpentine tab 116.

The insulator 108 surrounds the pin 106 and may be bonded to a periphery of the opening 104 of the cap 102 to electrically isolate the pin 106 from the cap 102. The insulator 108 is formed of an electrically insulating material, such as glass or a ceramic.

The channel 110 may be integrally formed on a surface of the cap 102 and is configured to provide a recess for the serpentine tab 116 to be nestled therein. The channel 110 may extend along a periphery of the cap 102 and may have a one or more curves. The recess of the channel 110 is disposed on a side of the cap 102 that faces the set of layers 124 and may be formed via a forming or stamping operation that results in the cap 102 being shaped or formed to create the channel 110.

At a second end of the serpentine tab 116, the serpentine tab 116 is coupled to one or more tabs 126 extending from the cathode or anode of the set of layers 124 by, for example, a welding operation. The serpentine tab 116 has a sufficient length, when manipulated, to facilitate a welding operation of the serpentine tab 116 to the set of layers 124. When coupled to the tab 126 extending from the set of layers 124, electrical energy from the cathode or anode layer, for example, passes through the tab 126 extending from the set of layers, to the serpentine tab 116, and to the pin 106, to thereby provide an external terminal for the battery cell 100.

In one aspect, by stowing, storing, housing or nestling the serpentine tab 116 within the channel 110, the serpentine tab 116 does not utilize space within the enclosure 121 thereby improving packaging efficiency and increasing energy capacity by eliminating the need for any space within the enclosure 121 to accommodate the serpentine tab 116. In other words, the channel 110 is configured to house a length of the serpentine tab 116 such that after welding of the serpentine tab 116 to the set of layers 124, the serpentine tab 116 may be stowed, stored, housed, or nestled entirely within the channel 110.

Figure 2:
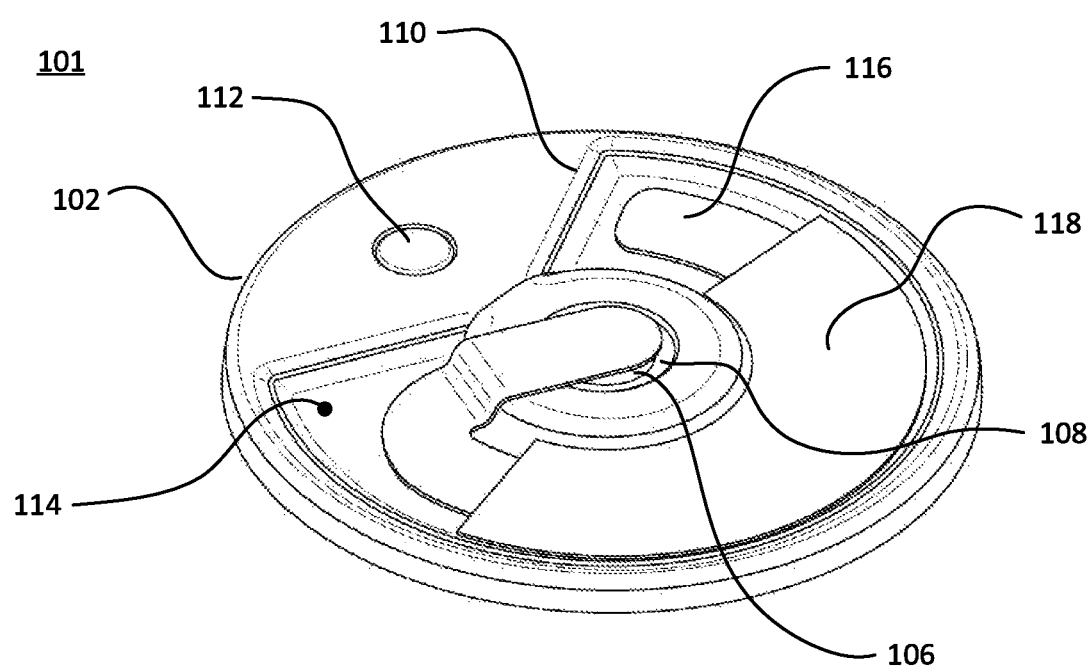
FIG. 2 illustrates a bottom perspective view of a feedthrough with a channel to house a tab, in accordance with various aspects of the subject technology.

FIG. 2 illustrates a bottom perspective view of the feedthrough 101 with the channel 110 to house the serpentine tab 116, in accordance with various aspects of the subject technology. As shown, the channel 110 comprises a recess formed on the cap 102 that is sized to stow, store, or house the serpentine tab 116. The serpentine tab 116 may have an insulated portion 118 extending between a first end and a second end of the serpentine tab 116. In one example, the insulated portion 118 may comprise a non-conductive film surrounding the serpentine tab 116. In another example, the insulated portion 118 may comprise an injection molded insulator surrounding the serpentine tab 116. The recess of the channel 110 may be sized to also accommodate the insulated portion 118 within the recess. Specifically, the first end of the serpentine tab 116 is electrically coupled to the pin 106 and the second end of the serpentine tab 116 is configured to be stowed, stored, or housed within the channel 110.

In one aspect, the serpentine tab 116 may have a three-dimensional shape to enable the serpentine tab to be connected to the pin 106 and also lay flat against the channel 110. For example, referring to FIG. 2, the serpentine tab 116 may have an offset at the first end to facilitate coupling with the pin 106 while enabling the remaining portion of the serpentine tab 116 to lay within the channel 110. As such, an intermediate portion of the serpentine tab 116 defined by a portion of the serpentine tab 116 between the offset at the first end and the second end of the serpentine tab 116, may be disposed entirely within the channel 110, as shown in FIG. 2. The second end of the serpentine tab 116 may also be disposed entirely within the channel 110.

In some aspects, the feedthrough 101 may further comprise an insert 114 disposed within the channel 110 to electrically isolate the serpentine tab 116 from the cap 102 or channel 110. The insert 114 may be molded from a thermoplastic to match the geometry of the channel 110 and have a three-dimensional profile that enables the insert 114 to insulate the serpentine tab on at least three sides or surfaces of the serpentine tab (e.g., backside, right side, left side).

Figure 3:
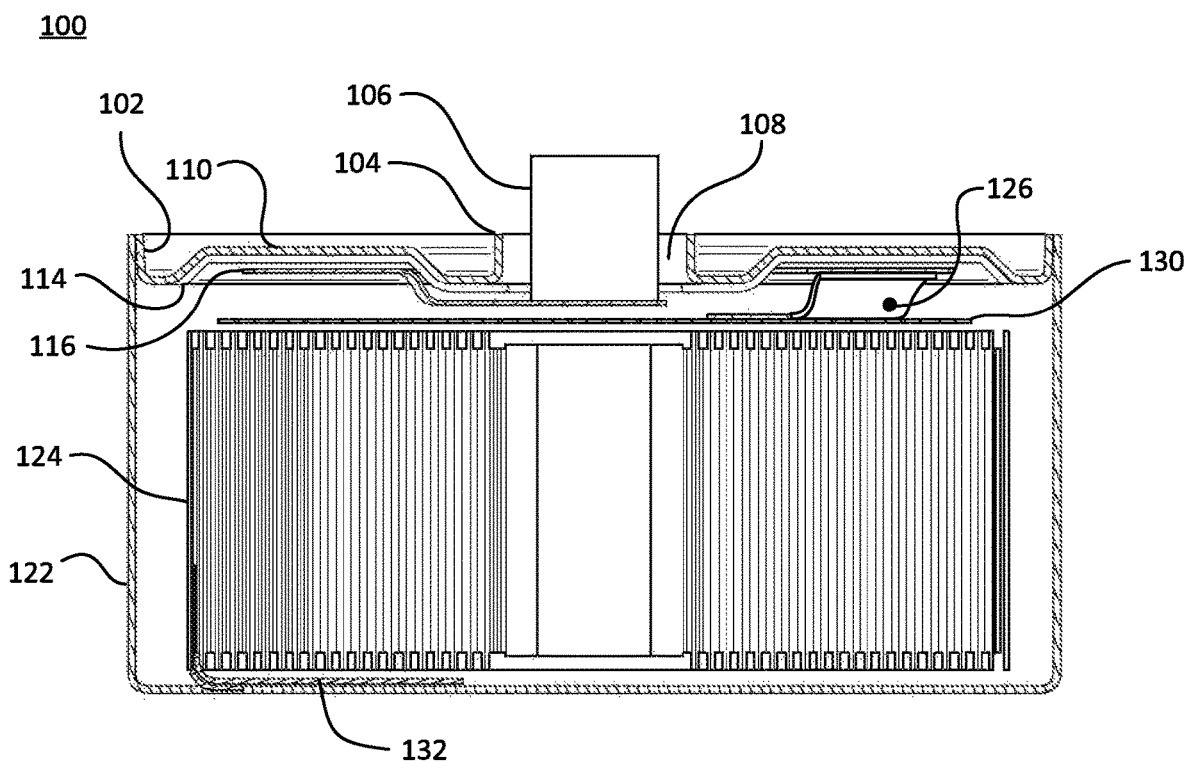
FIG. 3 illustrates a cross-section view of an assembled battery cell having a feedthrough with a channel to house a tab, in accordance with various aspects of the subject technology.

FIG. 3 illustrates a cross-section view of an assembled battery cell 100 having a feedthrough with the channel 110 to house the serpentine tab 116, in accordance with various aspects of the subject technology. The cap 102 is disposed over the cup 122 of the enclosure to seal the set of layers 124 therein. The channel 110 stows, stores or houses the serpentine tab 116 within a recess of the channel 110. Disposed between the serpentine tab 116 and the cap 102 is an insert 114 that is configured to electrically isolate the serpentine tab 116 from the cap 102. Extending through the cap 102 at an opening 104 is the pin 106. The first end of the serpentine tab 116 is coupled to the pin 106. The second end of the serpentine tab 116 is coupled to the tab 126 extending from the set of layers 124. The insulator 108 electrically insulates the pin 106 from the cap 102. Disposed between the set of layers 124 and the serpentine tab 116 is the insulating layer 130 that is configured to electrically insulate the set of layers 124 from the serpentine tab 116 and the cap 102. In one aspect, the set of layers 124 may be electrically coupled to the cup 122 by a second tab 132 extending from the set of layers 124 such that the cup 122 itself acts as an external battery terminal.

As shown, the channel 110 of the feedthrough is configured to stow, store or house the serpentine tab 116 entirely therein without utilizing additional space within the enclosure or cup 122, thereby improving packaging efficiency and increasing energy capacity of the battery cell by eliminating the need to allot space within the enclosure to accommodate the serpentine tab 116. The serpentine tab 116 is thus nestled within the channel 110 when the cap 102 is disposed on the cup 122.

Figure 4:
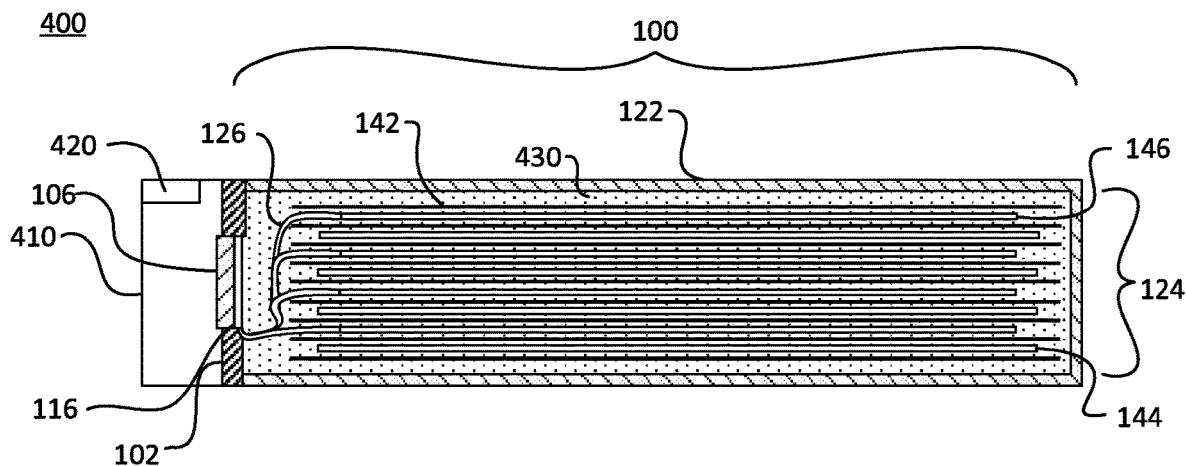
FIG. 4 illustrates a cross-section view of an assembled battery, in accordance with various aspects of the subject technology.

FIG. 4 illustrates a cross-section view of an assembled battery 400, in accordance with various aspects of the subject technology. The assembled battery 400 includes the battery cell 100, an enclosure comprising the cup 122, a feedthrough comprising the cap 102, a battery management unit 410, and battery terminals 420. The battery management unit 410 is configured to manage recharging of the battery cell 100. The terminals 420 are configured to engage with corresponding connectors on a portable electronic device to provide power to components of the portable electronic device.

The battery cell 100 includes a set of layers 124 comprising a cathode with an active coating 144, a separator 142, and an anode with an active coating 146. For example, the cathode 144 may be an aluminum foil coated with a lithium compound (e.g., $LiCoO_2$, $LiNCoMn$, $LiCoAl$ or $LiMn_2O_4$) and the anode 146 may be a copper foil coated with carbon or graphite. The separator 142 may include polyethylene (PE), polypropylene (PP), and/or a combination of PE and PP, such as PE/PP or PP/PE/PP. The separator 142 comprises a micro-porous membrane that also provides a "thermal shut down" mechanism. If the battery cell reaches the melting point of these materials, the pores shut down which prevents ion flow through the membrane.

The set of layers 124 may be wound to form a jelly roll structure or can be stacked to form a stacked-cell structure. The set of layers 124 are enclosed within cup 122 and immersed in an electrolyte 430, which for example, can be a LiPF6-based electrolyte that can include Ethylene Carbonate (EC), Polypropylene Carbonate (PC), Ethyl Methyl Carbonate (EMC) or DiMethyl Carbonate (DMC). The electrolyte can also include additives such as Vinyl carbonate (VC) or Polyethylene Soltone (PS). The electrolyte can additionally be in the form of a solution or a gel.

The anode layers 146 of the set of layers 124 may be coupled to the cup 122 or may be coupled to a feedthrough via a tab (not shown) extending from the anode layers 146. The cathode layers 144 of the set of layers 124 may be coupled to the serpentine tab 116 via one or more tabs 126 extending from each cathode layer 144. As described above, the serpentine tab 116 is housed within the channel (not shown) of the cap 102 to increase energy capacity of the battery cell 100 by eliminating the need to allot space within the enclosure to accommodate the serpentine tab 116

Figure 5:
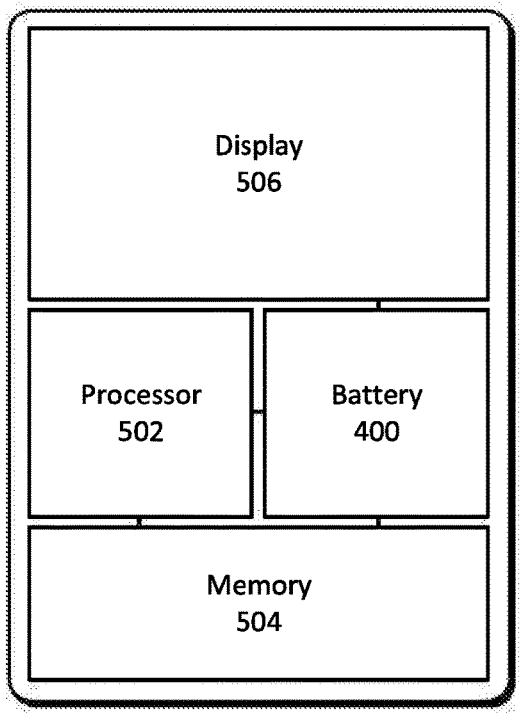
FIG. 5 illustrates a portable electronic device, in accordance with various aspects of the subject technology.

FIG. 5 illustrates a portable electronic device 500, in accordance with various aspects of the subject technology. The above-described rechargeable battery 400 can generally be used in any type of electronic device. For example, FIG. 5 illustrates a portable electronic device 500 which includes a processor 502, a memory 504 and a display 506, which are all powered by the battery 400. Portable electronic device 500 may correspond to a laptop computer, tablet computer, mobile phone, personal digital assistant (PDA), digital music player, watch, and wearable device, and/or other type of battery-powered electronic device. Battery 400 may correspond to a battery pack that includes one or more battery cells. Each battery cell may include a set of layers sealed in an enclosure, including a cathode with an active coating, a separator, an anode with an active coating, and utilize an electrical feedthrough that maximizes packaging efficiency through implementation of a feedthrough 101 (as shown in FIG. 1) having the channel 110 to stow, store or house the serpentine tab 116, as described above.

Figure 6:
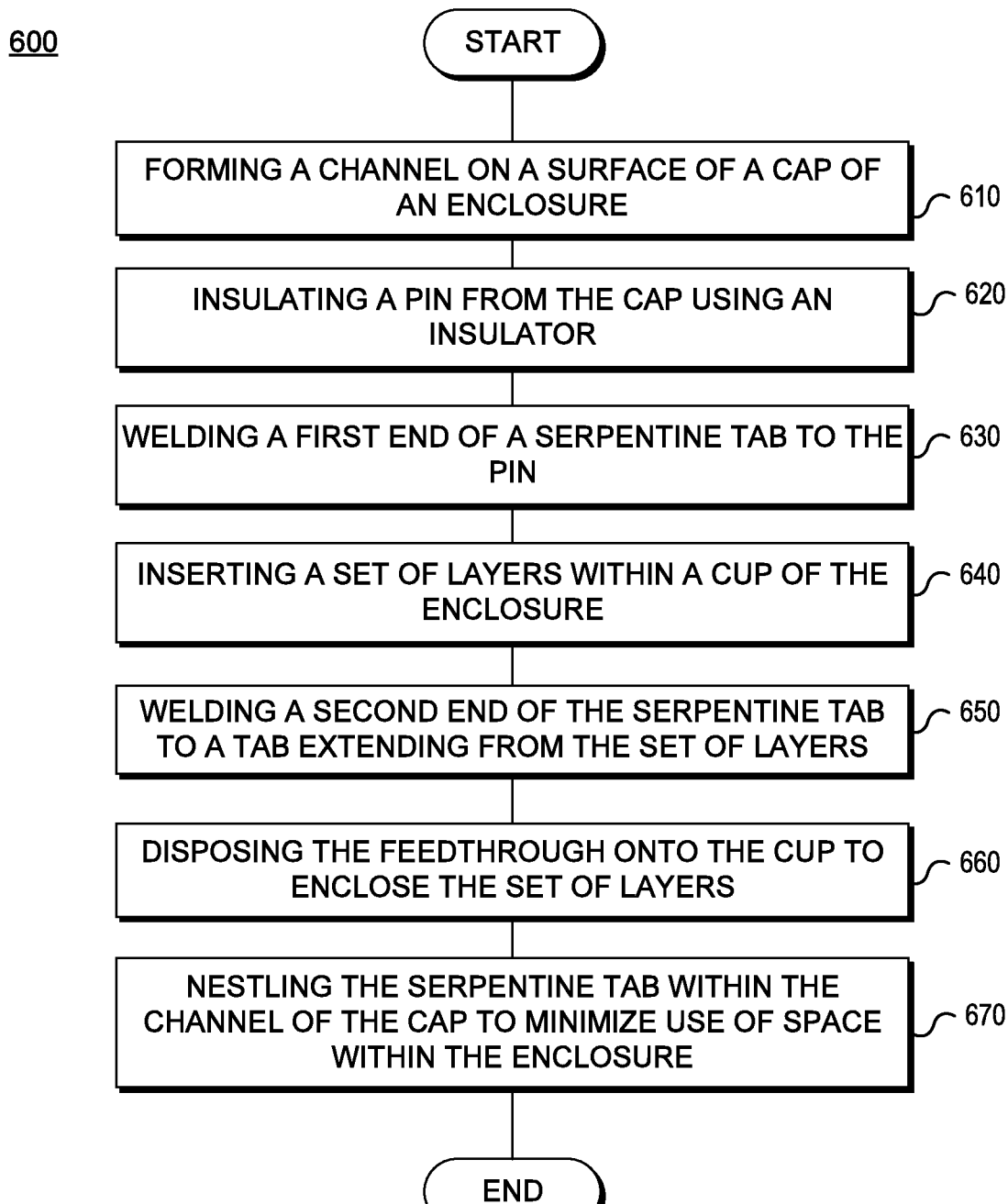
FIG. 6 illustrates an example method for manufacturing a battery cell, in accordance with various aspects of the subject technology.

FIG. 6 illustrates an example method 600 for manufacturing a battery cell, in accordance with various aspects of the subject technology. It should be understood that, for any process discussed herein, there can be additional, fewer, or alternative steps performed in similar or alternative orders, or in parallel, within the scope of the various embodiments unless otherwise stated.

At operation 610, a channel is formed within a cap of a feedthrough of a battery cell. The channel comprises a recess on a surface of the cap to store a serpentine tab of the feedthrough. The channel may be formed through a stamping or forming operation that results in a material of the cap to be deformed to create the channel. The channel may comprise one or more curves and have a length that is longer than a length of the serpentine tab to enable the serpentine tab to be stored or nestled therein. In one example, the channel may extend circumferentially along a periphery of the cap.

The cap further comprises an opening that is configured to receive a pin. The pin is configured to form an external battery terminal to an anode or cathode of a set of layers and is made of an electrically conductive material, such as molybdenum. At operation 620, an insulator is formed around the pin to electrically insulate the pin from the cap. The insulator may be bonded to a sidewall or periphery of the opening of the cap and to an outer surface of the pin. The insulator may be made of glass.

The serpentine tab may comprise an elongated electrically conductive material that has one or more curves that when stretched linearly, provides a sufficient working or service length to enable a welding, bonding, or coupling operation to be performed between the serpentine tab and the anode or cathode of the set of electrodes. In one aspect, the serpentine tab is configured to be straightened through manipulation by a user, and return to a curved or wound configuration at rest. In other words, the serpentine tab may have shape memory that enables the serpentine tab to be manipulated to lengthen its length along an axis, and when not manipulated, to return to a configuration having a shorter length along the same axis. For example, the serpentine tab may comprise a semi-circle shape having a first length along an axis that passes along a first and second end of the serpentine tab. The first and second ends of the serpentine tab may be moved apart thereby increasing a length between the first and second ends of the serpentine tab to a second length that is greater than the first length. Upon release of the first or second end of the serpentine tab, the serpentine tab returns to its initial shape and a length of the serpentine tab reduced to the first length.

In another aspect, the serpentine tab may have a three-dimensional shape. For example, the serpentine tab may comprise an offset to enable welding (e.g., laser welding, percussion welding, resistance welding, ultrasonic welding, etc.), bonding, or coupling to the pin where the pin extends beyond a thickness of the cap (as shown in FIG. 3). In one aspect, the offset enables the serpentine tab to be welded to an end of the pin and thereafter, lay within the channel. At operation 630, the first end of the serpentine tab is welded to the pin. A remaining portion of the serpentine tab is nestled entirely within the channel, as shown in FIG. 2, as the offset enables the first end of the serpentine tab to reach an end of the pin, without causing the remaining portion of the serpentine tab to be removed from the channel.

In one aspect, an insert that conforms to a shape of the channel may be bonded, adhered, or attached to the channel to insulate the serpentine tab from the cap to thereby prevent electrical contact between the serpentine tab and the cap. The insert may be manufactured through molding of thermoplastic or a non-conductive polymer or insulator.

In some aspects, the feedthrough (e.g., cap, pin, insulator, channel, serpentine tab, insert) is a subassembly that may be assembled separately from the other components of the battery cell. By decoupling the feedthrough assembly from the electrode or enclosure assembly, any debris or particles that may be formed during welding of the serpentine tab to the pin or forming of the insulator around the pin, do not impact the electrodes of the battery cell.

At operation 640, the set of layers is inserted within a cup of an enclosure. The enclosure may comprise stainless steel or other material suitable for enclosing a battery cell as would be known by a person of ordinary skill. As discussed above, the set of layers comprise a cathode layer, an anode layer, and a separator layer disposed between the cathode layer and the anode layer. In some aspects, an insulating layer may be disposed in between the set of layers and the serpentine tab to prevent electrical contact between the set of layers and the serpentine tab.

At operation 650, the second end of the serpentine tab is welded (e.g., laser welding, percussion welding, resistance welding, ultrasonic welding, etc.), coupled, or bonded to a tab extending from the set of layers to thereby electrically couple the pin to the set of layers. In one aspect, because the serpentine tab has one or more curves, a length of the serpentine tab may be lengthened when manipulated to enable welding, coupling or bonding to the tab extending from the set of layers. In other aspects, because the serpentine tab has shape memory, upon completion of the welding operation, the serpentine tab automatically returns to its initial shape having a reduced length and lays within the channel thereby maximizing available space within the cup of the enclosure for the set of layers, without requiring complicated bending or manipulation of the serpentine tab after welding.

At operation 660, the feedthrough is disposed onto the cup to enclose the set of layers. The cap of the feedthrough may be welded, bonded, or coupled to the cup of the enclosure to seal the set of layers within the enclosure. At operation 670, the serpentine tab nestles within the channel of the cap to minimize use of space within the enclosure. Because the serpentine tab is configured to automatically lay flat against the channel when the feedthrough is disposed on the enclosure, the serpentine tab is entirely stowed, stored, and housed within the channel without occupying space within the enclosure and without requiring management of a cumbersome service loop that must be folded several times in order to tuck the tab neatly within the enclosure.

The enclosure may be filled with electrolyte after the set of layers are sealed within the enclosure through a fill hole. A plug may be thereafter welded, bonded, or coupled to the cap to plug the fill hole.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. A battery cell, comprising:
   a set of layers comprising a cathode layer, an anode layer, and a separator layer disposed between the cathode layer and the anode layer;
   an enclosure enclosing the set of layers;
   a cap disposed over an opening of the enclosure, wherein the cap comprises a channel extending along a periphery of a surface of the cap; and
   a feedthrough comprising:
      a pin extending from the surface of the cap to form an external battery terminal;

an insulator surrounding the pin and configured to electrically isolate the pin;
a serpentine tab electrically coupled to the pin extending from the surface of the cap at a first end, the serpentine tab electrically coupled to a tab extending from the set of layers at a second end; and
wherein the serpentine tab is nested within the channel to minimize use of space within the enclosure.

2. The battery cell of claim 1, further comprising an insulating layer disposed between the set of layers and the serpentine tab.

3. The battery cell of claim 1, wherein the feedthrough further comprises a plug configured to seal a hole used to fill the enclosure with electrolyte.

4. The battery cell of claim 1, wherein the feedthrough further comprises an insert disposed within the channel, the insert configured to electrically isolate the serpentine tab from the channel.

5. The battery cell of claim 1, wherein an intermediate portion of the serpentine tab and the second end of the serpentine tab are disposed entirely within the channel, the intermediate portion extending from the first end.

6. The battery cell of claim 1, wherein the serpentine tab comprises an insulated portion extending between the first end and the second end.

7. The battery cell of claim 1, wherein the insulator is formed of glass.

8. A battery feedthrough, comprising:
a cap configured to be disposed over an opening of the enclosure, wherein the cap comprises a channel extending along a periphery of a surface of the cap;
a pin disposed through an opening of the cap, the pin extending from the surface of the cap to form an external battery terminal;
an insulator surrounding the pin, the insulator bonded to a periphery of the opening of the cap and configured to electrically isolate the pin from the cap;
a channel formed on a surface of the cap;
a serpentine tab electrically coupled to the pin extending from the surface of the cap at a first end; and
wherein an intermediate portion of the serpentine tab and a second end of the serpentine tab are disposed entirely within the channel to minimize use of space within the cap.

9. The battery feedthrough of claim 8, wherein the feedthrough further comprises an insert disposed within the channel, the insert configured to electrically isolate the serpentine tab from the cap.

10. The battery feedthrough of claim 8, wherein a material of the pin comprises molybdenum.

11. The battery feedthrough of claim 8, wherein the serpentine tab comprises an insulated portion extending between the first end and the second end.

* * * * *